Figure 1:
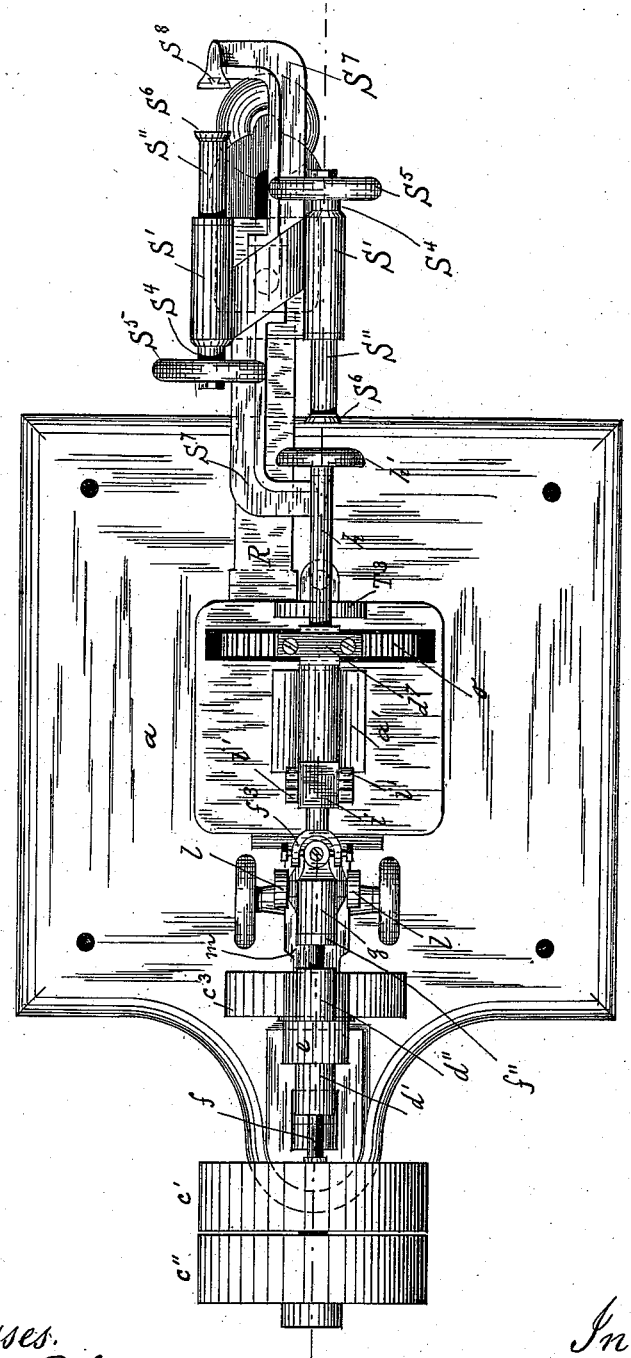

(No Model.)  3 Sheets—Sheet 1.

A. B. FOWLER.
BURNISHING MACHINE.

No. 377,826. Patented Feb. 14, 1888.

Witnesses.
Harry W. Robinson.
Charles H. Fogg.

Inventor.
Alfred B. Fowler.
by Alban Andrew, his atty.

N. PETERS. Photo-Lithographer, Washington, D. C.

(No Model.) 3 Sheets—Sheet 2.
A. B. FOWLER.
BURNISHING MACHINE.
No. 377,826. Patented Feb. 14, 1888.
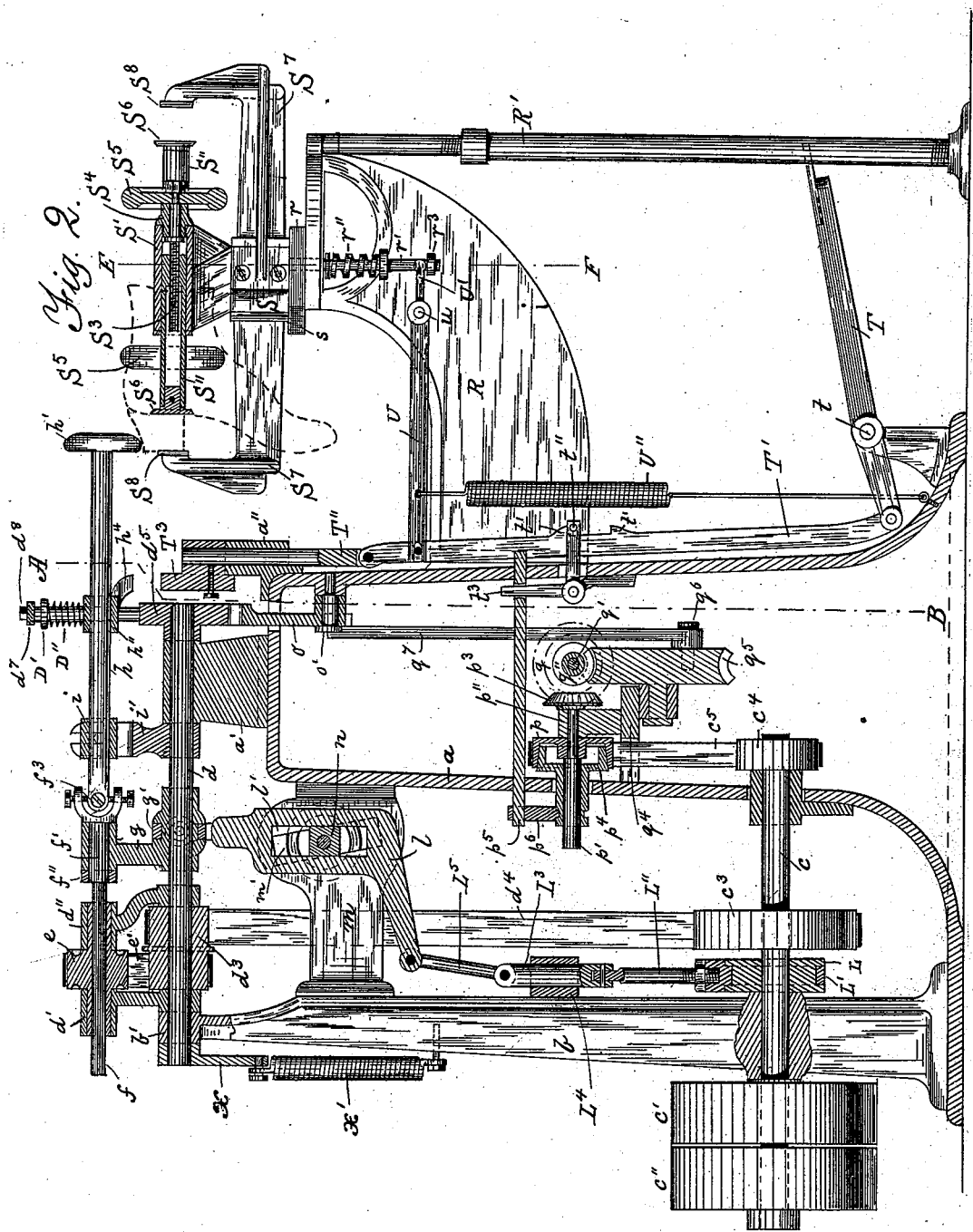
Witnesses:
Harry W. Robinson.
Charles H. Fogg.
Inventor.
Alfred B. Fowler.
by Alban Andren, his atty

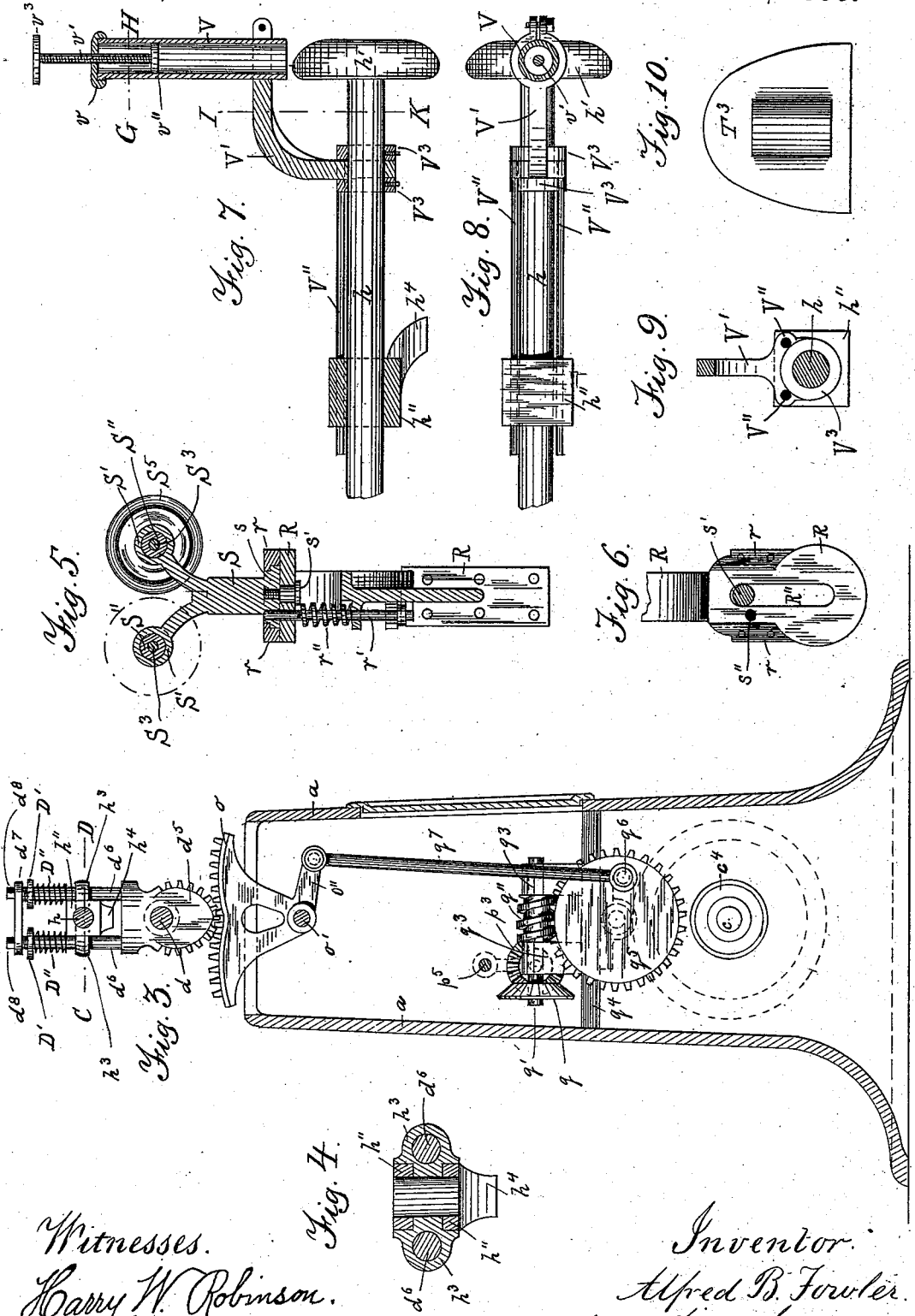

UNITED STATES PATENT OFFICE.

ALFRED B. FOWLER, OF EXETER, NEW HAMPSHIRE, ASSIGNOR TO THE ROCKINGHAM MACHINE COMPANY.

BURNISHING-MACHINE.

SPECIFICATION forming part of Letters Patent No. 377,826, dated February 14, 1888.

Application filed June 6, 1887. Serial No. 240,392. (No model.)

*To all whom it may concern:*

Be it known that I, ALFRED B. FOWLER, a citizen of the United States, and a resident of Exeter, in the county of Rockingham and State of New Hampshire, have invented new and useful Improvements in Heel-Burnishing Machines, of which the following, taken in connection with the accompanying drawings, is a specification.

This invention relates to improvements in heel-burnishing machines, and it is carried out as follows, reference being had to the accompanying drawings, wherein—

Figure 1 represents a plan view of the machine. Fig. 2 represents a vertical longitudinal section. Fig. 3 represents a cross-section on the line A B shown in Fig. 2. Fig. 4 represents an enlarged cross-section on the line C D shown in Fig. 3. Fig. 5 represents a cross-section on the line E F in Fig. 2, showing the jack, its bracket, and locking device. Fig. 6 represents a plan view of the outer end of the jack-supporting bracket. Fig. 7 represents a vertical section of the waxing device for applying wax to the rotary burnishing-tool. Fig. 8 represents a cross-section on the line G H shown in Fig. 7; and Fig. 9 represents a vertical section on the line I K, also shown in Fig. 7. Fig. 10 represents an enlarged end view of the heel-shaped cam for raising the burnishing-tool out of contact with the heel after the latter is burnished.

Similar letters refer to similar parts wherever they occur on the different parts of the drawings.

$a$ is the main frame or standard, to the base of which is secured the upright rear post, $b$, as shown in Fig. 2.

$c$ is the driving-shaft located in bearings in frame $a$ and post $b$, and provided with fast and loose pulleys $c'$ $c''$, as is common in machines of this kind.

$a'$ is a bearing secured to top of frame $a$, in which is located the rock-shaft $d$, its rear end being supported in a bearing, $b'$, in the upper end of post $b$, as shown in Fig. 2. To shaft $d$ are secured the upwardly-projecting arms or levers $d'$ and $d''$, in which are journaled the projecting ends of the small pulley $e$, the latter having a square hole through its center in which is loosely fitted the square shaft $f$.

Between the arms $d'$ and $d''$ is loosely journaled on the rock-shaft $d$ the pulley $d^3$, to which a rotary motion is imparted by means of belt $d^4$, leading from pulley $c^3$ on driving-shaft $c$, and by means of belt $e'$ a rotary motion is imparted from pulley $d^3$ to pulley $e$ and its longitudinally-movable shaft $f$.

On the rock-shaft $d$ is splined the hub of the arm or lever $g$, in the upper end of which is journaled the cylindrical end $f'$ of the square shaft $f$, having collar $f''$ secured to it at the rear of the upper end of lever $g$ and universally jointed at $f^3$ to the rotary burnisher-shaft $h$, which latter is journaled in the yielding bearings $i$ and $h''$, and has secured to its forward end the burnishing-tool $h'$, in a manner as shown and described in the Letters Patent granted to me November 16, 1886, No. 352,864.

A longitudinal reciprocating motion is imparted to the burnishing-shaft $h$ by means of the rock-lever $l$, the upper end of which is pivoted to the ring $g'$, located in an annular groove on the hub of lever $g$, in the same manner as shown and described in my pending application for a patent for heel-burnishing machine, filed March 12, 1887, No. 230,583, said lever $l$ being adjustably pivoted to the stationary bracket $m$ by means of fulcrum-block $n$, that is adjustable in slots $l'$ $m'$ in lever $l$ and bracket $m$, respectively, as fully shown and described in my aforesaid pending application, and by which means the amount of reciprocation of the burnisher-tool in the direction of its shaft can be regulated according to the height of the heel that is to be burnished.

The lever $l$ is reciprocated by means of the eccentric-block L, secured to driving-shaft $c$, which block is surrounded with the ring L′, as is common in making eccentrics. To ring L′ is secured the rod L″, the upper end of which is pivoted to the bar or block L³, the latter being vertically guided in the bearing-piece L⁴, secured to post $b$, as shown in Fig. 2. A rod or link, L⁵, connects the upper end of block L³ to the lower end of the bent lever $l$, and it will thus be seen that a quick reciprocating motion is imparted to the burnisher-shaft from the rotary driving-shaft and the intermediate connecting mechanism, as described.

To the forward end of the rock-shaft $d$ is secured the lobed gear $d^5$, (shown in Figs. 2 and 3,) the teeth of which intermesh in the teeth of the segmental lobed gear $o$, that is pivoted on the bolt or stud $o'$, secured to frame $a$, as shown in Figs. 2 and 3. This lobed gear $o$ is rocked on its fulcrum by intermediate connecting mechanism from the driving-shaft $c$, as will hereinafter be described.

The object of the lobed gears $d^5 o$ is to impart to the burnisher-tool such an oscillating motion as to cause it to follow the curvature of the heel with a uniform velocity from the front of the heel to its rear and to the front opposite and back again to the starting-point, and thus cause each portion of the heel-surface to be equally acted on by the burnisher.

To the upper end of the lobed gear $d^5$ are secured the guide-rods $d^6 d^6$, which are secured together in their upper ends by means of yoke $d^7$ and set-screws $d^8 d^8$, or equivalent devices.

$h''$ is the adjustable bearing for the burnisher-shaft $h$, and it is pivoted loosely to the ears $h^3 h^3$, located on the guide-rods $d^6 d^6$, as shown in Figs. 3 and 4, such ears being free to move up and down on the said guide-rods $d^6 d^6$ and the bearing $h''$, free to rock on the pivots of said ears as the burnisher is raised or lowered. The upper ends of the rods $d^6 d^6$ are screw-threaded and provided with thumb-nuts $D' D'$, as shown in Figs. 2 and 3. On the guide-rods $d^6 d^6$, between the upper side of bearing $h''$ and under side of thumb-nuts $D' D'$, are located the springs $D'' D''$, which serve to automatically hold the burnisher-tool against the heel that is being burnished, as shown in Fig. 2. By adjusting the thumb-nuts $D' D'$ on the rods $d^6 d^6$ any desired pressure of the burnisher against the heel may be obtained.

The lobed gear $o$ is automatically rocked on its fulcrum $o'$ by suitable intermediate connecting mechanism from driving-shaft $c$, as follows: To the inner end of said shaft $c$ is secured the pulley $c^4$. (Shown in Figs. 2 and 3.) By means of the belt $c^5$, leading from said pulley $c^4$ to the pulley $p$, the latter is set in a continuous rotary motion. The pulley $p$ is loose on spindle $p'$, which latter is journaled in bearing $p''$, and has secured to its inner end the bevel-gear $p^3$. (Shown in Fig. 2.) On spindle $p'$ is splined the friction-clutch $p^4$, which is operated to and from the loose pulley $p$ by means of the shipper-rod $p^5$, located in bearings in frame $a$, and having secured to its rear end the small arm $p^6$, the inner end of which fits in a groove in the hub of friction-clutch $p^4$, as is common in devices of this kind. The rod $p^5$ is connected to a treadle mechanism by which it is operated in one direction to disconnect the friction-clutch $p^4$ from pulley $p$, and to a spring by which the friction-clutch is connected to said pulley $p$, as will hereinafter be more fully described.

The bevel-gear $p^3$ meshes in the teeth of the bevel-gear $q$, secured to the worm-shaft $q'$, provided with the worm $q''$. (Shown in Figs. 2 and 3.) Worm-shaft $q'$ is located in bearings $q^3 q^3$, secured in a suitable manner to the interior of the hollow standard $a$, preferably to a plate, $q^4$, that is secured to standard $a$. The worm $q''$ meshes in the teeth of the worm-wheel $q^5$, the shaft or central spindle of which is suitably journaled in a bearing secured to plate $q^4$, as shown in Fig. 2.

To the face of the worm-wheel $q^5$ is secured the crank-pin $q^6$, having pivoted to it the lower end of the link or rod $q^7$, the upper end of which is pivoted to an arm or extension, $o''$, on the segmental lobed gear $o$, as shown in Fig. 3. Thus it will be seen that an oscillating motion is imparted to the burnisher-shaft from the rotary driving-shaft $c$ as long as the friction-clutch $p^4$ is held in contact with the loose pulley $p$, and such oscillation of the burnisher-shaft is stopped when the clutch $p^4$ is withdrawn by the treadle mechanism from the loose pulley $p$.

The bearing $i$ for the burnisher-shaft $h$ is guided up and down in a forked arm, $i'$, secured to the rock-shaft $d$ in precisely the same manner as shown and described in my aforesaid pending application.

R is the jack-supporting bracket, secured in a suitable manner to the standard $a$, and having its outer end preferably supported from the floor by means of an adjustable metal rod or pipe, R', as shown in Fig. 2.

Upon the bracket R is supported my improved rotary duplex jack for holding the shoes the heels of which are to be burnished, and said jack is constructed as follows: It consists of the jack-post S, of which $s$ is the base-plate, that is adapted to slide in guides $r r$ on top of bracket R, as shown in Figs. 5 and 6, such sliding motion of the jack being limited by means of the slot R'' in top of bracket R and the pin or screw $s'$, passing through such slot and secured to base-plate $s$, as shown in said Figs. 5 and 6. The guides $r r$ extend only a portion of the length of the top of bracket R, as shown in Figs. 2 and 6, so that when the base-plate $s$ of the jack is drawn backward to the limit of its stroke it is disengaged from said guides, and the post S can then be turned half a revolution around its axis and pushed forward, so that its base $s$ will enter the guides $r r$ and thus guide the shoe properly to the burnisher-tool, and when in such position it is automatically locked by means of the spring-pressed pin $r'$, located in bearings in the bracket R and actuated by means of the spring $r''$ for forcing the upper end of said pin into a perforation, $s''$, in the base $s$ of the jack-post, as shown in Figs. 2, 5, and 6. Said spring-pressed pin is unlocked from the jack-plate by means of a foot-treadle and connecting mechanism, as will be hereinafter more fully shown and described.

At a proper distance apart are made, in one piece with the upper end of the jack-post S, the horizontal tubular bearings S' S', in which are located, respectively, the sleeves S'' S'', each of which is splined or otherwise guided in its bearing S', to prevent its rotation therein. The interior of each sleeve S'' is screw-threaded, and into it is screwed the screw-threaded spindle S³, which is held from longitudinal motion in said sleeve S'' by means of the nut S⁴, screwed into one end of the sleeve S'', and a collar on spindle S³, and a crank or hand-wheel, S⁵, in its outer end, as shown in Fig. 2, similar to the manner in which tail-stocks are arranged and operated in metal-turning lathes and similar tools. In its outer end the sleeve S'' has attached to it a disk or plate, S⁶, adapted to rest against the insole of the boot or shoe while being held on the jack.

To the jack-post S are secured the brackets or bent arms S⁷ S⁷, the upper ends of which terminate opposite to the sleeves S'' S'', and are there provided with detachable top-lift rests S⁸ S⁸. (Shown in Figs. 1 and 2.) The shoe to be burnished is clamped in position, as shown in dotted lines in Fig. 2, between the top-lift rest S⁸ and the plate S⁶ on the end of sleeve S'' and secured firmly in place by means of hand-wheel S⁵ and screw-spindle S³. While one boot or shoe is being burnished another one is secured to the opposite jack portion between the parts S⁶ and S⁸, and as soon as one shoe is finished the locking-pin r' is withdrawn from the jack by means of a foot-treadle, the jack is drawn toward the operator, turned half a revolution around its axis, pressed forward and locked in position by the pin r', and held there while another boot-heel is being acted on, during which operation the first boot or shoe is removed from the jack and another one secured to it, and so on.

T is the foot-treadle pivoted at $t$ to a bracket or other stationary part of the machine, as shown in Fig. 2. To the inner end of the treadle T is pivoted the link or rod T', the upper end of which is connected to the bar or plunger T'', the latter being guided in the bearing $a''$, secured to the standard $a$, as shown in Fig. 2. To the upper end of the bar T'' is secured the tool-lifter T³, (shown in Figs. 1 and 2 and enlarged in Fig. 10,) which piece is made in the form of an enlarged heel, and when pushed upward by means of treadle T it comes in contact with a projection, $h^4$, on the bearing $h''$, (shown in Figs. 2, 3, 4, and 7,) causing the burnisher-shaft $h$ to be raised against the influence of its springs D'' D'' and causing the tool $h'$ to be raised or forced outward sufficiently to be disengaged from the heel of the boot or shoe, by which means the burnisher-tool can be instantly withdrawn from the heel as soon as the latter is finished, and thus allow for the manipulation of the duplex jack.

To the rod T' is suitably connected the lever U, that is pivoted at $u$ to the bracket R, and is provided with an extension, U', adapted to rest against a collar or projection, $r^3$, on the lock-spindle $r'$, as shown in Figs. 2 and 5, and by this means the lock-spindle $r'$ is depressed against the influence of its spring $r''$ and disengaged from the jack-plate $s$ when the treadle T is depressed. The treadle T, tool-lifter T³, and lever U are automatically returned to their normal positions (shown in Fig. 2) when the pressure on treadle T is relieved by the influence of the spring U'', the upper end of which is connected to the lever U or its connections and the lower end of said spring secured to the standard $a$, as shown in Fig. 2.

For the purpose of actuating the shipper-bar $p^5$ from the treadle T, I make on the link or rod T' a pair of projections or teeth, $t'$ $t'$, which as the treadle is raised and lowered come in contact with a projection, $t''$, on the bell-crank lever $t^3$, pivoted to the frame $a$ or other stationary part of the machine, and having one of its ends pivoted or otherwise connected in a suitable manner to shipper-rod $p^5$, as shown in Fig. 2, and by this means the friction-clutch $p^4$ is withdrawn from the loose pulley $p$ when the treadle T is depressed, thus stopping the oscillating motion of the burnisher and its shaft $h$ at the same time as the tool-lifter raises the burnisher-tool away from the heel of the boot or shoe and simultaneously with the withdrawal of the jack-locking pin $r'$, as heretofore described. The action of the spring U'' on lever U and link T' causes the friction-clutch $p^4$ to be automatically connected to pulley $p$ as soon as the operator removes the foot-pressure from the treadle T.

When it is desired to produce what is termed a "wax-heel," I employ the waxing device or wax-feeder shown in Figs. 7, 8, and 9, and it consists of a tube or wax receptacle, V, open in its lower end and arranged directly above the rotary burnisher-tool $h'$, as shown in Figs. 7 and 8. The upper end of the tube V is closed with a suitable cap, $v$, having a central screw-threaded perforation for the reception of the screw $v'$, as shown in Fig. 7. The screw $v'$ has a piston or plunger, $v''$, in its lower end and a disk or handle, $v^3$, in its upper end, as shown. The wax to be brought in contact with the rotary burnisher-tool $h'$ is contained in the case V below the piston $v''$, and by turning the handle $v^3$ more or less the wax is forced downward and against the rotary burnisher-tool from time to time, as may be required.

The tube or case V is adjustably secured to the bracket V', that is journaled on the shaft $h$, and is provided with a pair of rods, V'' V'', the rear ends of which are passed through corresponding perforations in the bearing $h''$, as shown in Figs. 7, 8, and 9, and by means of said rods the bracket V' is prevented from rotating with the shaft $h$. For the purpose of holding the bracket V' on the shaft $h$ in such a position that the wax-tube V shall be directly above the burnisher-tool $h'$, as shown in Figs. 7 and 8, I secure to the shaft $h$ on opposite sides of the bracket V' the adjustable collars V³ V³, which are made adjustable on the said shaft by means of set-screws or equivalent devices.

To the rear end of the rock-shaft $d$ is secured a crank arm or lever, X, to which is attached the upper end of a spring, X', (shown in Fig. 2,) the lower end of the latter being attached to the post $b$ or other stationary part of the machine. Said spring serves to counteract the momentum of the burnisher-shaft and its adjuncts as such parts are oscillated. The device also serves to prevent the lobed gears $d^5$ o from rattling during the operation of the machine, and insures a more steady, uniform, and noiseless motion of the working parts.

What I wish to secure by Letters Patent and claim is—

1. In a burnishing-machine, the rotary burnisher-shaft $h$, universally jointed to the longitudinally-movable and oscillating shaft $f$, combined with the yielding front bearing, $h''$, pivoted to ears $h^3$ $h^3$, adapted to slide on the rods $d^6$ $d^6$, secured to a block on the rock-shaft $d$, and provided with springs $D''$ $D''$ and regulating-nuts $D'$ $D'$, as and for the purpose set forth.

2. In a burnishing-machine, the rotary burnisher-shaft universally jointed in its rear end to the longitudinally movable and oscillating shaft $f$, and the yielding bearing $h''$ on said burnisher-shaft, combined with the vertically-adjustable tool-lifter $T^3$, and suitable connection to the foot-treadle of the machine, as and for the purpose set forth.

3. In a burnishing-machine, the rotary burnishing-shaft $h$, arranged in yielding bearings relative to the rock-shaft $d$, combined with the lobed gears $d^5$ o, the former mounted on said rock-shaft and the latter actuated with a rocking movement, as described, for the purpose of causing the burnisher-tool to move along the curved path of the heel with a uniform speed relative to the curvature of the heel, as and for the purpose set forth.

4. In a burnishing-machine, the shipper-rod $p^5$, for regulating the rocking motion of shaft $d$, the tool-lifter $T^3$, for raising the burnisher-tool away from the heel, and the spring locking-pin $r'$ on the jack, in combination with a single treadle, T, and a spring, $U''$, for simultaneously operating such parts, as and for the purpose set forth.

5. In a burnishing-machine, the duplex rotary jack, as described, mounted in guides $r$ $r$ upon the bracket R, and adapted to be drawn out of such guides, rotated half a revolution, and again inserted in said guides and automatically locked in position upon the said bracket R, substantially as and for the purpose set forth.

6. In a burnishing-machine, the improved duplex jack, as described, consisting of post S, adapted to slide and rotate on the bracket R, and having the sleeves $S'$ $S'$ and screw-pressed insole-rests $S^6$ $S^6$, combined with the top-lift supporting-arms $S^7$ $S^7$, secured to post S, as and for the purpose set forth.

7. In a burnishing-machine, the waxing device, as described, consisting of the tube or case V, with its screw-shaft and piston $v'$ $v''$, the bracket $V'$, journaled on the burnisher-shaft and having rods $V''$ $V''$, projecting into perforations in the bearing $h''$, and adjustable collars $V^3$ $V^3$ on the burnisher-shaft, as and for the purpose set forth.

8. In a burnishing-machine, the rotary and longitudinally-reciprocating burnisher-shaft arranged in yielding bearings relative to the rock-shaft $d$, combined with the arm X, secured to the said rock-shaft, and the spring $X'$, for the purpose as set forth and described.

9. In a burnishing-machine, the rocking shaft $d$, having loose pulley $d^3$ and arms $d'$ $d''$, firmly secured to it, combined with the pulley $e$, loosely mounted in said arms and having longitudinally-movable and rotary shaft $f$, arranged within it, and the burnisher $h'$, secured to the shaft $h$, universally jointed to shaft $f'$, as and for the purpose set forth.

10. In a burnishing-machine, the rocking lever $l$ and its connecting mechanism to the driving-shaft $c$, as described, combined with the rock-shaft $d$, and the arm $g$, adapted to slide upon said rock-shaft, and having a bearing in its upper end for the shaft $f'$, and the burnisher $h'$, secured to the shaft $h$, universally jointed to shaft $f'$, as and for the purpose set forth.

In testimony whereof I have signed my name to this specification, in the presence of two subscribing witnesses, on this 3d day of June, A.D. 1887.

ALFRED B. FOWLER.

Witnesses:
C. C. LITTLEFIELD,
R. A. LITTLEFIELD.